US009471110B2

(12) United States Patent
Wu et al.

(10) Patent No.: US 9,471,110 B2
(45) Date of Patent: Oct. 18, 2016

(54) ELECTRONIC DEVICE

(71) Applicant: Acer Incorporated, New Taipei (TW)

(72) Inventors: Ming-Yen Wu, New Taipei (TW);
Han-Tsung Shen, New Taipei (TW);
Yan-Lin Kuo, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 14/624,941

(22) Filed: Feb. 18, 2015

(65) Prior Publication Data
US 2015/0277507 A1   Oct. 1, 2015

(30) Foreign Application Priority Data

Mar. 31, 2014  (TW) .............................. 103111919 A

(51) Int. Cl.
*G06F 1/16* (2006.01)
*G06F 3/02* (2006.01)

(52) U.S. Cl.
CPC ............ *G06F 1/1681* (2013.01); *G06F 1/1626* (2013.01); *G06F 1/1632* (2013.01); *G06F 1/1654* (2013.01); *G06F 1/1669* (2013.01); *G06F 1/1679* (2013.01); *G06F 3/0202* (2013.01)

(58) Field of Classification Search
CPC .. G06F 1/1632; G06F 1/1669; G06F 1/1626; G06F 1/1654; G06F 1/1681; G06F 1/1679; G06F 1/1616; G06F 3/0202
USPC ............ 361/679.17, 679.41, 679.55, 679.56, 361/679.57, 679.58, 679.29; 312/223.1, 312/223.2; 710/303, 304
See application file for complete search history.

(56) References Cited

U.S. PATENT DOCUMENTS

| 6,590,547 | B2* | 7/2003 | Moriconi ............. | G06F 1/1616 248/917 |
| 8,498,100 | B1* | 7/2013 | Whitt, III ............. | G06F 1/1618 361/679.17 |
| 8,817,456 | B2 | 8/2014 | Lin et al. | |
| 9,047,049 | B2 | 6/2015 | Yang et al. | |
| 9,170,613 | B2* | 10/2015 | Lan ...................... | G06F 1/1681 |
| 2003/0231464 | A1* | 12/2003 | Weng ................... | G06F 1/1632 361/679.41 |

(Continued)

FOREIGN PATENT DOCUMENTS

| JP | 2012-253179 | 12/2012 |
| TW | 547906 | 8/2003 |

(Continued)

OTHER PUBLICATIONS

Chinese language office action dated Jun. 1, 2016, issued in application No. TW 103111919.

*Primary Examiner* — Adrian S Wilson
*Assistant Examiner* — Abhishek Rathod
(74) *Attorney, Agent, or Firm* — McClure, Qualey & Rodack, LLP

(57) ABSTRACT

An electronic device is provided, including a first module, a second module, and a protecting member. The first module includes a side surface and a fixed member, wherein the fixed member includes a protrusion protruding from the side surface. The second module includes a recess. The protecting member encompasses the protrusion and includes a first surface, a second surface, and an elastic portion, wherein the first surface is opposite to the second surface. The elastic portion protrudes from the first surface. When the protrusion is joined to the recess, the second surface and the elastic portion contact an inner wall of the recess.

11 Claims, 7 Drawing Sheets

(56) References Cited

U.S. PATENT DOCUMENTS

| | | | | |
|---|---|---|---|---|
| 2004/0160734 A1* | 8/2004 | Yim | G06F 1/1616 | 361/679.29 |
| 2008/0024966 A1* | 1/2008 | Huang | G06F 1/1626 | 361/679.06 |
| 2009/0231805 A1* | 9/2009 | Schlesener | B29C 45/1676 | 361/679.55 |
| 2013/0044425 A1* | 2/2013 | Lin | G06F 1/1669 | 361/679.43 |
| 2013/0155583 A1* | 6/2013 | Yang | G06F 1/1626 | 361/679.01 |
| 2013/0170126 A1* | 7/2013 | Lee | G06F 1/1654 | 361/679.17 |
| 2015/0098182 A1* | 4/2015 | Liu | G06F 1/1681 | 361/679.55 |
| 2015/0192957 A1* | 7/2015 | Lee | G06F 1/1632 | 361/679.58 |

FOREIGN PATENT DOCUMENTS

| | | |
|---|---|---|
| TW | 201310206 | 3/2013 |
| TW | 201327107 | 7/2013 |

* cited by examiner

ELECTRONIC DEVICE

CROSS REFERENCE TO RELATED APPLICATIONS

The present application is based on, and claims priority from, Taiwan Patent Application No. 103111919, filed on Mar. 31, 2014, the disclosure of which is hereby incorporated by reference herein in its entirety.

BACKGROUND OF THE INVENTION

1. Field of the Invention

The application relates in general to an electronic device, and in particular, to an electronic device having a protecting member for connecting a first module with a second module.

2. Description of the Related Art

The touch-control functionality for electronic products is becoming more and more prevalent. Some notebook computers with detachable displays have appeared on the market, wherein a detachable display can be a tablet computer and used individually. The tablet computer is normally joined to a keyboard of the notebook computer by a latch mechanism on the keyboard. To separate the tablet computer from the keyboard, however, the latch mechanism has to be released, which can be inconvenient for users. Furthermore, a gap may be formed between the latch mechanism and the tablet computer, such that an uncomfortable shaking of the tablet computer relative to the keyboard may occur.

BRIEF SUMMARY OF INVENTION

To address the deficiency of conventional electronic products, an embodiment of the invention provides an electronic device, including a first module, a second module, and a protecting member. The first module includes a side surface and a fixed member, wherein the fixed member includes a protrusion protruding from the side surface. The second module includes a recess. The protecting member encompasses the protrusion and includes a first surface, a second surface, and an elastic portion, wherein the first surface is opposite to the second surface. The elastic portion protrudes from the first surface. When the protrusion is joined to the recess, the second surface and the elastic portion contact an inner wall of the recess.

In some embodiments, the distance between the elastic portion and the second surface exceeds the width of the recess when the protrusion is separated from the recess.

In some embodiments, the longitudinal axis of the elastic portion is parallel to the depth direction of the recess.

In some embodiments, the elastic portion includes a guiding surface connected to the first surface, and the guiding surface is a curved or inclined surface.

In some embodiments, when the protrusion is separated from the recess, an end of the elastic portion is located between the guiding surface and the side surface.

In some embodiments, when the protrusion is joined to the recess, the first surface is in contact with the inner wall of the recess.

In some embodiments, the first module further includes an opening with an end of the elastic portion accommodated therein.

In some embodiments, the fixed member includes a hole with the elastic portion accommodated therein.

In some embodiments, the protecting member includes POM (polyoxymethylene), PE (polyethylene), nylon, or rubber.

In some embodiments, the protecting member and the fixed member are integrally formed as one piece.

In some embodiments, the first module includes a main body and a connector. The connector is pivotally connected to the main body, and the side surface is formed on the connector.

In some embodiments, when the protrusion is joined to the recess, a first surface of the connector is aligned with a second surface of the second module, wherein the first surface and the side surface are adjacent to each other.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the touch control system are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
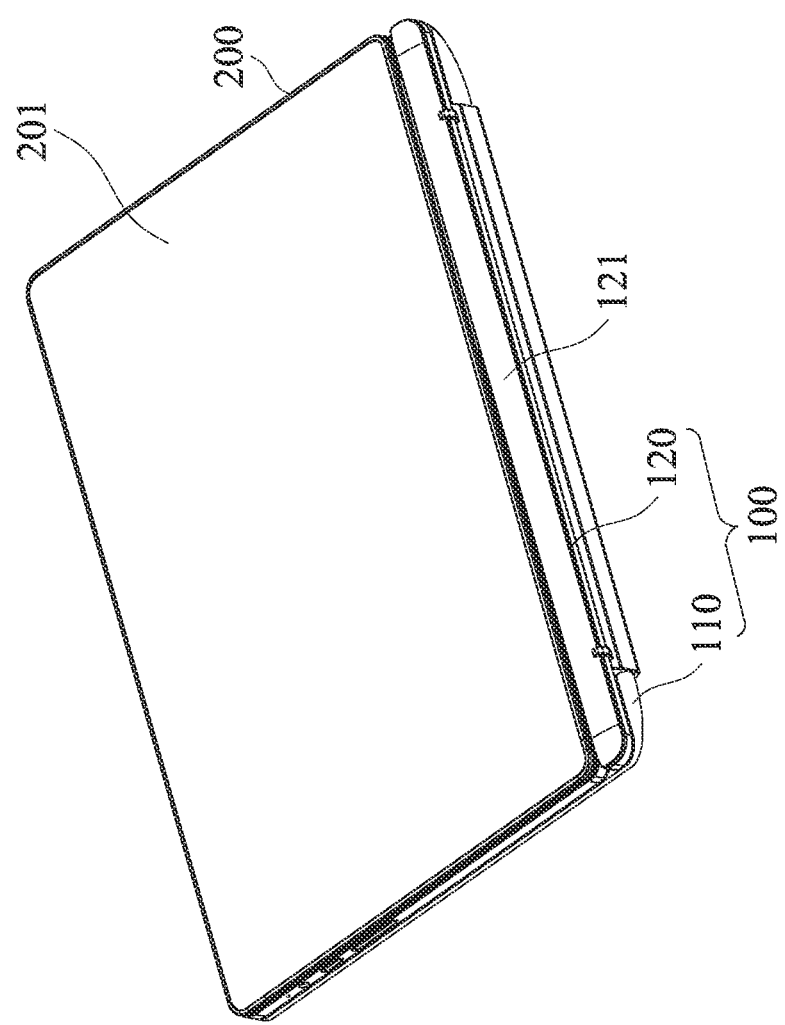
FIG. 1 is a schematic diagram of an electronic device according to an embodiment of the invention.

Referring to FIG. 1, an electronic device primarily comprises a first module 100 and a second module 200. The first module 100 comprises a main body 110 and a connector 120, wherein the connector 120 is pivotally connected to the main body 110, and detachably connected to the second module 200. When the second module 200 is connected to the connector 120, the second module 200 and the connector 120 can rotate relative to the main body 110. As shown in FIG. 1, when the second module 200 is joined to the connector 120, the first surface 121 of the connector 120 is adjacent to and substantially aligned with the second surface 201 of the second module 200. In this embodiment, the first module 100 can be an input module (for example, a keyboard or a touchpad), and the second module 200 can be a display module (for example, a tablet computer or a flat display).

It should be noted that when the second module 200 is joined to the main body 110 via the connector 120, the metal contacts on the second module 200 (not shown) are electrically connected to the metal contacts on the connector 120 (not shown), such that the first module 100 and the second module 200 can transfer electrical signals to each other.

Figure 2A:
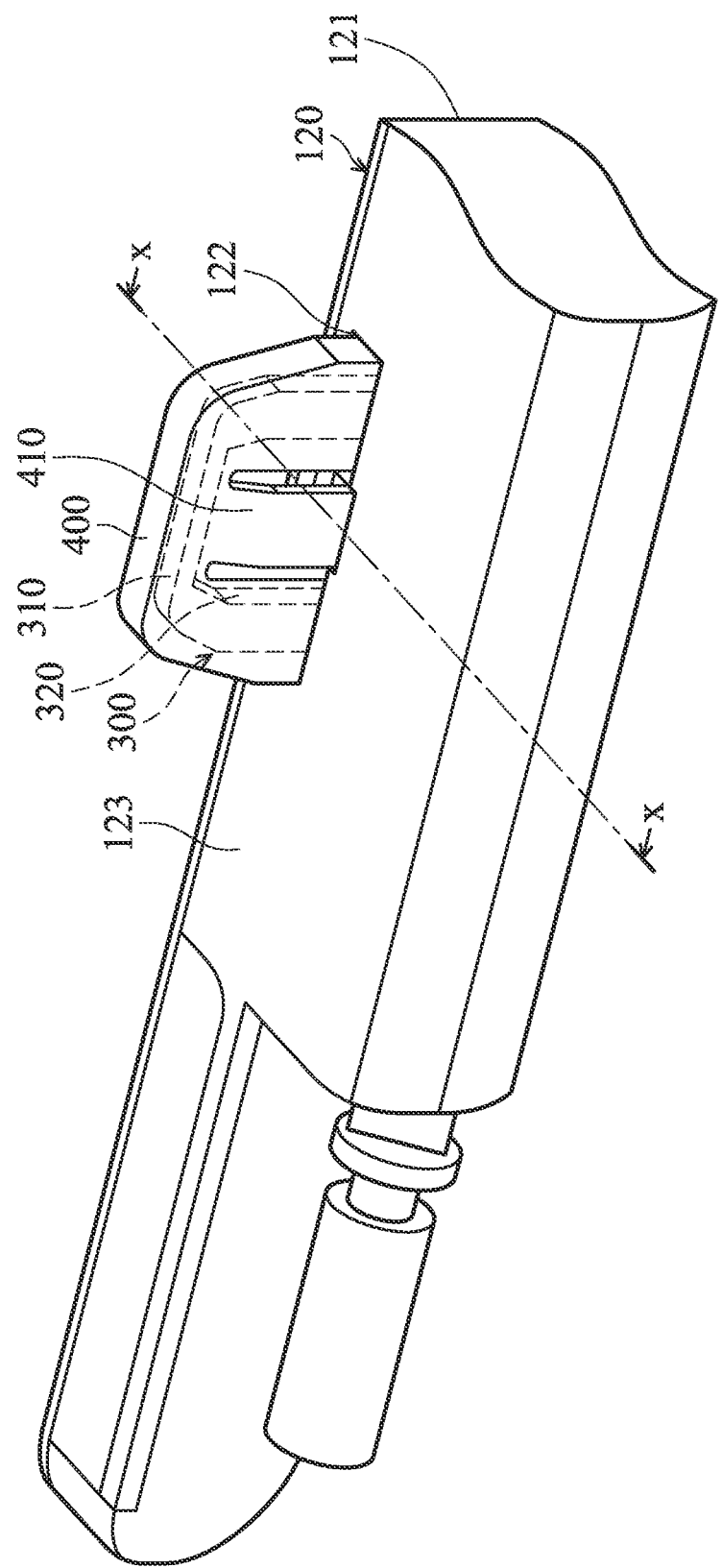
FIG. 2A is a partial schematic diagram of a connector according to an embodiment of the invention.

Referring to FIG. 2A, an opening 122 is formed on a side surface 123 of the connector 120. A fixed member 300 and a protecting member 400 are disposed on the connector 120, extending through the opening 122 and protruding from the side surface 123 to connect the second module 200. The side surface 123 and the first surface 121 are adjacent to each other.

Figure 2B:
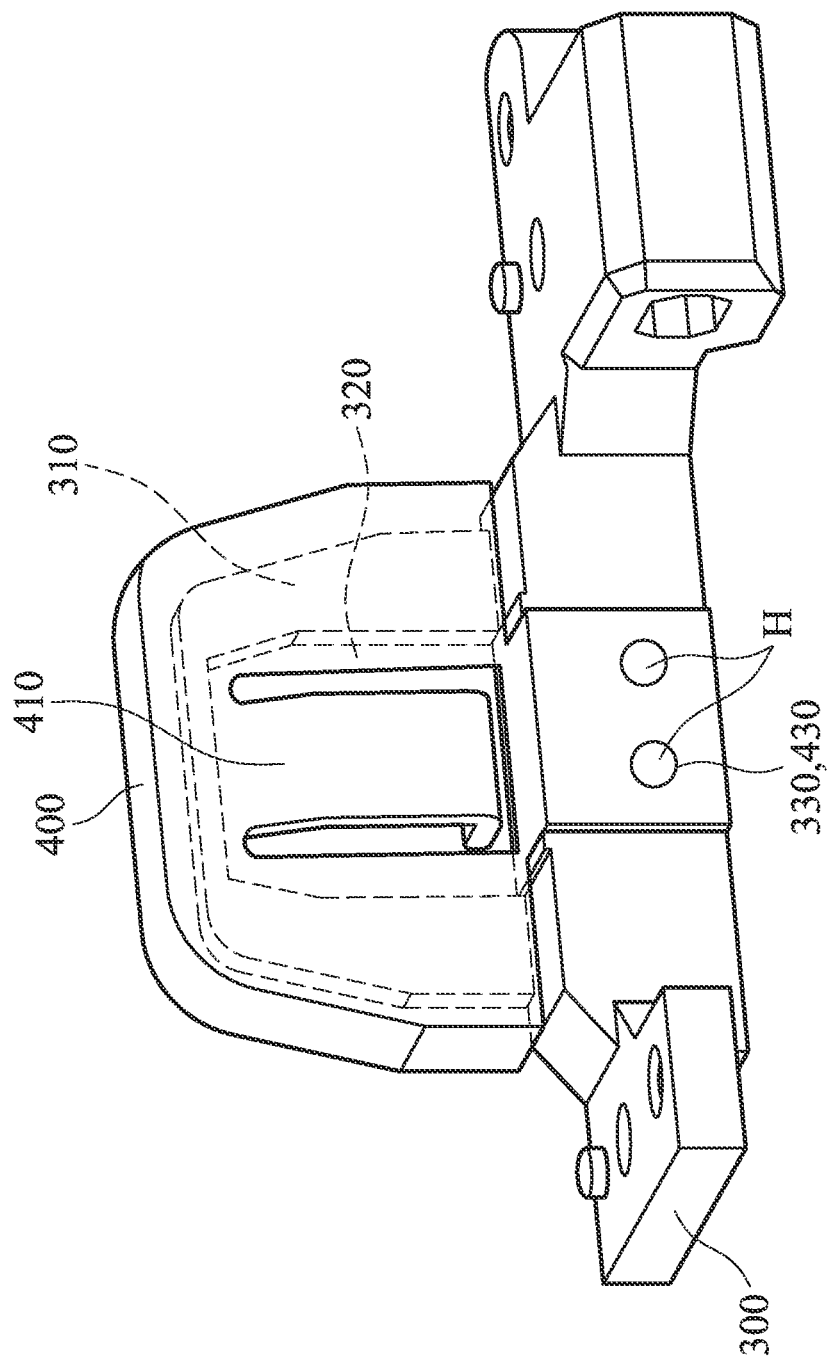
FIG. 2B is a schematic diagram of a protecting member joined to a fixed member according to an embodiment of the invention.

As shown in FIGS. 2A and 2B, the fixed member 300 is made of metal and comprises a C-shaped protrusion 310 with a hole 320 that is formed in the middle thereof. The protecting member 400 encompasses the protrusion 310, such that the protrusion 310 of the fixed member 300 is accommodated in the protecting member 400. Referring to FIG. 2B, the protecting member 400 comprises a through hole 430 aligned with a through hole 330 of the fixed member 300. After hot melt glue H is injected into the through holes 330 and 430, the protecting member 400 can firmly encompass the fixed member 300. In this embodiment, the inner surface of the protecting member 400 is tightly attached to the outer surface of the protrusion 310. Namely, there is no gap between the protecting member 400 and the protrusion 310, such that the separation between the protecting member 400 and the protrusion 310 during usage of the electronic device can be prevented. In some embodiments, the protecting member 400 may be fixed to the fixed member 300 by inserting a screw into the through holes 330 and 430 for easy disassembly and maintenance.

Figure 2C:
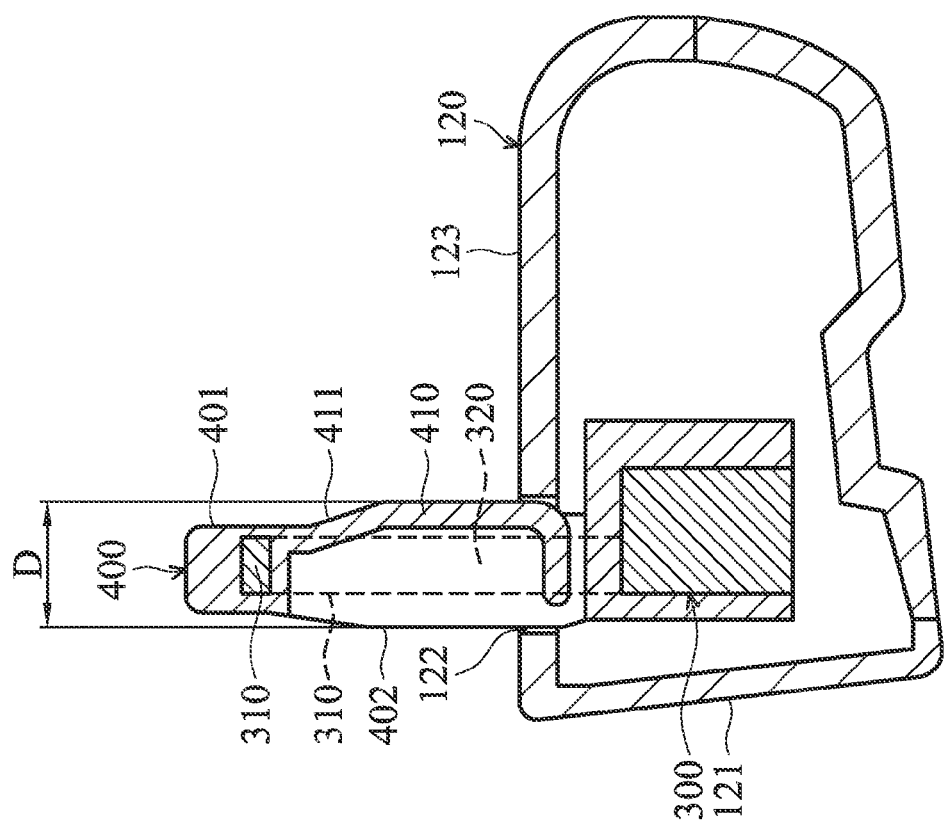
FIG. 2C is a cross-sectional view taken along the line x-x in FIG. 2A.

FIG. 2C is a cross-sectional view taken along the line x-x in FIG. 2A. Referring to FIGS. 2A-2C, the protecting member 400 forms a C-shaped structure with an elastic portion 410 in the middle thereof. The C-shaped structure has a first surface 401 and a second surface 402, and the elastic portion 410 forms an L-shaped structure (FIG. 2C). The elastic portion 410 is connected to the first surface 401 via a guiding surface 411. When the protecting member 400 is joined to the fixed member 300, the elastic portion 410 is accommodated in the hole 320 and protrudes from the first surface 401 (FIG. 2C).

As shown in FIGS. 2A and 2C, the protrusion 310 of the fixed member 300 and the protecting member 400 extend through the opening 122 and protrude from the side surface 123 of the connector 120. An end of the elastic portion 410 is accommodated in the opening 122 to prevent excessive and permanent deformation of the elastic portion 410. In some embodiments, the end of the elastic portion 410 can also be directly fixed to the fixed member 300 or the connector 120.

Figure 3:
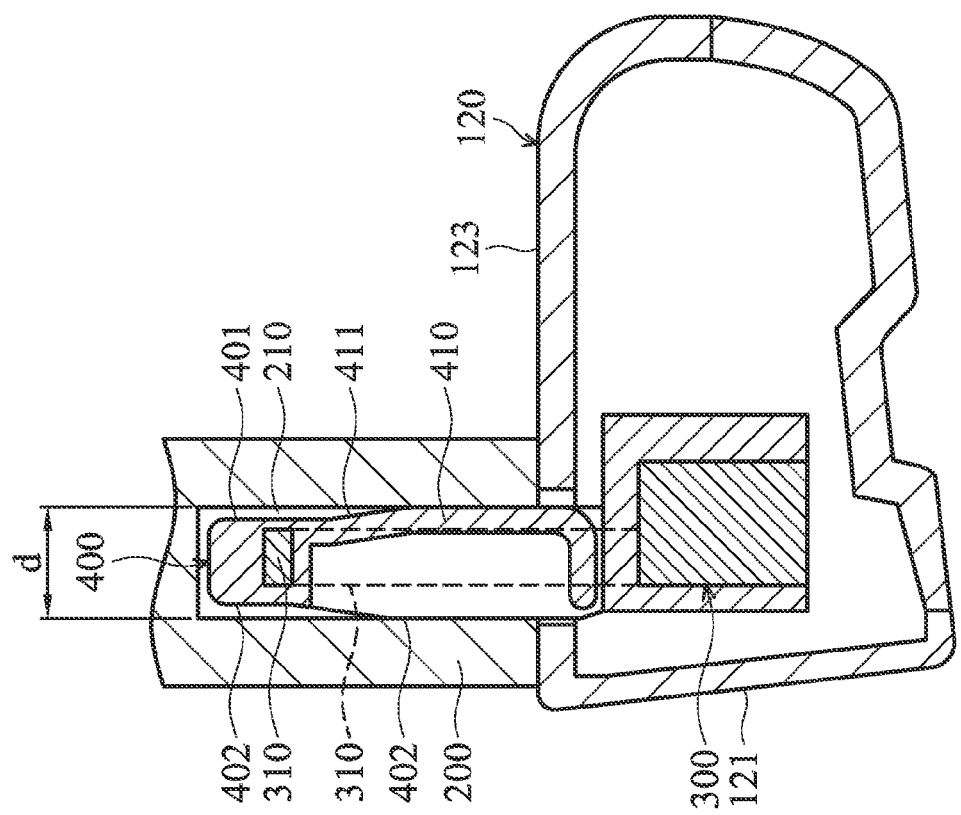
FIG. 3 is a schematic diagram of a protrusion joined to a recess of the second module according to an embodiment of the invention.

Referring to FIG. 3, to join the second module 200 to the connector 120, the protrusion 310 of the fixed member 300 with the protecting member 400 can be inserted into a recess 210 of the second module 200. The recess 210 has a width d, and a distance D (FIG. 2C) that is formed between the elastic portion 410 and the second surface 402, wherein D>d. Therefore, as the protrusion 310 of the fixed member 300 and the protecting member 400 are inserted into the recess 210, the second surface 402 of the protecting member 400 and the elastic portion 410 abut the inner wall of the recess 210, and an elastic force is provided by the elastic portion 410, such that the connector 120 and the second module 200 can be firmly joined to each other by the friction therebetween to prevent separation thereof.

To separate the second module 200 from the connector 120, the second module 200 can be pulled upward, such that the protrusion 310 and the protecting member 400 are separated from the recess 210. It should be noted that the elastic portion 410 comprises the guiding surface 411 (a curved surface or inclined surface), and the longitudinal axis of the elastic portion 410 is parallel to the depth direction of the recess 210, such that the second module 200 can be moved upward smoothly, and convenient usage can be facilitated.

Specifically, the protecting member 400 may comprise POM (polyoxymethylene), PE (polyethylene), nylon, or rubber. Thus, the abrasion between the protecting member 400 and the recess 210 of the second module 200 can be reduced. In some embodiments, the protecting member 400 and the fixed member 300 can be integrally formed in one piece.

Figure 4A:
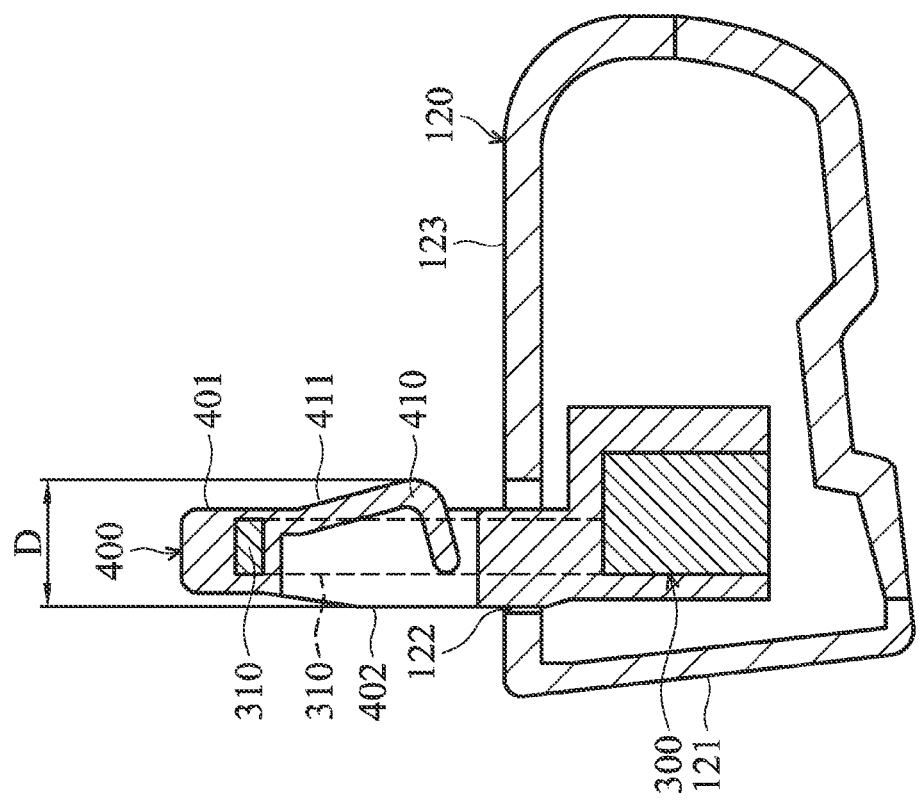
FIG. 4A is a schematic diagram of a protecting member joined to a fixed member according to another embodiment of the invention.
Figure 4B:
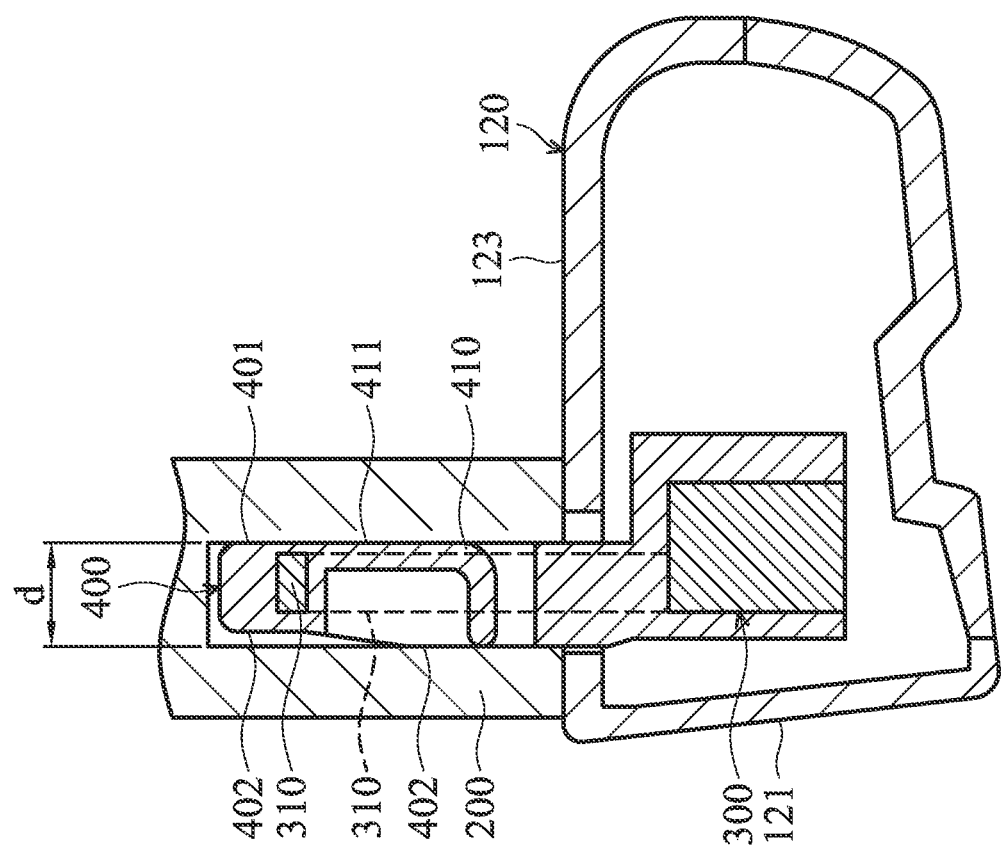
FIG. 4B is a protrusion joined to a recess of the second module according to an embodiment of the invention.

Referring to FIG. 4A, in another embodiment, one end of the elastic portion 410 of the protecting member 400 is connected to the first surface 401 through the guiding surface 411, and the other end of the elastic portion 410 is located between the guiding surface 411 and the side surface 123. That is, the end of the elastic portion 410 is not accommodated in the opening 122. Therefore, the distance D between the elastic portion 410 and the second surface 402 can be enlarged. Referring to FIG. 4B, when joining the second module 200 with the connector 120, the protrusion 310 of the fixed member 300 and the protecting member 400 are inserted into a recess 210 of the second module 200, and the deformation of the elastic portion 410 is enlarged, such that the elastic force provided by the elastic portion 410 can be increased. Furthermore, as shown in FIG. 4B, when the second module 200 is joined to the connector 120, the first surface 401 and the guiding surface 411 of the elastic portion 410 contact the inner wall of the recess 210, whereby the connector 120 and the second module 200 can be stably joined to each other.

In summary, an electronic device including a protecting member 400 is provided in the invention. The protecting member 400 is fixed to the fixed member 300 which is disposed in the connector 120. When the fixed member 300 and the protecting member 400 are inserted into the recess 210 of the second module 200, the elastic portion 410 of the elastic member 400 can provide an elastic force, such that the second module 200 and the connector 120 can be stably joined to each other by the friction therebetween. Furthermore, the elastic portion 410 of the elastic member 400 comprises a guiding surface 411, and the longitudinal axis of the guiding surface 411 is parallel to the depth direction of the recess 210. When the second module 200 is separated from the connector 120, the second module 200 can be moved directly upward without applying any latch mechanism, thus facilitating easy and intuitive usage for the user. On the other hand, with the protecting member 400 and the fixed member 300 protruding from the side surface 123 of the connector 120, and the connector 120 pivotally connected to the main body 110, when the first module 100 and second module 200 are joined to each other, the first surface 121 of the connector 120 adjacent to the side surface 123 can be aligned with the second surface 201 of the second module 200, such that the electronic device can achieve an integrated appearance.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An electronic device, comprising:
    a first module, comprising a side surface and a fixed member, wherein the fixed member comprises a protrusion protruding from the side surface;
    a second module, comprising a recess; and
    a protecting member, encompassing the protrusion, comprising a first surface, a second surface, and an elastic portion, wherein the first surface is opposite to the second surface, and when the protrusion is inserted in the recess, the second surface and the elastic portion contact an inner wall of the recess, wherein a distance between the elastic portion and the second surface exceeds a width of the recess when the protrusion is separated from the recess.

2. The electronic device as claimed in claim 1, wherein a longitudinal axis of the elastic portion is parallel to a depth direction of the recess.

3. The electronic device as claimed in claim 1, wherein the elastic portion comprises a guiding surface connected to the first surface, and the guiding surface is a curved or inclined surface.

4. The electronic device as claimed in claim 3, wherein when the protrusion is separated from the recess, an end of the elastic portion is located between the guiding surface and the side surface.

5. The electronic device as claimed in claim 1, wherein when the protrusion is joined to the recess, the first surface contacts the inner wall of the recess.

6. The electronic device as claimed in claim 1, wherein the first module further comprises an opening with an end of the elastic portion accommodated therein.

7. The electronic device as claimed in claim 1, wherein the fixed member comprises a hole with the elastic portion accommodated therein.

8. The electronic device as claimed in claim 1, wherein the protecting member comprises POM (polyoxymethylene), PE (polyethylene), nylon, or rubber.

9. The electronic device as claimed in claim 1, wherein the protecting member and the fixed member are integrally formed.

10. The electronic device as claimed in claim 1, wherein the first module comprises a main body and a connector pivotally connected to the main body, and the side surface is formed on the connector.

11. The electronic device as claimed in claim 10, wherein when the protrusion is inserted in the recess, a first surface of the connector is aligned with a second surface of the second module, and the first surface and the side surface are adjacent to each other.

* * * * *